United States Patent
Muraji

(10) Patent No.: US 6,637,385 B2
(45) Date of Patent: Oct. 28, 2003

(54) INTERNAL COMBUSTION ENGINE WITH EXHAUST GAS CONTROL DEVICE

(75) Inventor: Tetsuo Muraji, Kanagawa (JP)

(73) Assignee: Mikuni Corporation, Tokyo (JP)

( * ) Notice: Subject to any disclaimer, the term of this patent is extended or adjusted under 35 U.S.C. 154(b) by 0 days.

(21) Appl. No.: 10/204,598

(22) PCT Filed: Feb. 24, 2001

(86) PCT No.: PCT/JP01/01328

§ 371 (c)(1),
(2), (4) Date: Aug. 23, 2002

(87) PCT Pub. No.: WO01/63106

PCT Pub. Date: Aug. 30, 2001

(65) Prior Publication Data

US 2003/0019445 A1 Jan. 30, 2003

(30) Foreign Application Priority Data

Feb. 24, 2000 (JP) ........................................ 2000-046849

(51) Int. Cl.⁷ ................................................. F01L 9/04
(52) U.S. Cl. ............................... 123/90.11; 251/129.01; 123/315
(58) Field of Search ......................... 123/90.11, 568.11, 123/568.16, 568.2, 568.21, 315; 251/129.15, 129.16, 129.01, 129.02

(56) References Cited

U.S. PATENT DOCUMENTS

| | | | | |
|---|---|---|---|---|
| 3,905,344 A | * | 9/1975 | Villella | 123/75 C |
| 3,918,420 A | * | 11/1975 | Villella | 123/75 C |
| 4,098,237 A | * | 7/1978 | Suquet | 123/75 C |
| 4,108,119 A | * | 8/1978 | McWhorter | 123/75 C |
| 4,426,967 A | * | 1/1984 | McWhorter | 123/315 |
| 5,022,353 A | | 6/1991 | Kamamura | 123/21 |
| 5,129,369 A | * | 7/1992 | Kawamura | 123/90.11 |
| 5,271,229 A | * | 12/1993 | Clarke et al. | 60/605.1 |
| 5,586,523 A | | 12/1996 | Kawahara | 123/65 VB |
| 5,720,242 A | * | 2/1998 | Izuo | 123/90.11 |
| 6,431,129 B1 | * | 8/2002 | Hammoud et al. | 123/90.15 |

FOREIGN PATENT DOCUMENTS

| | | | | |
|---|---|---|---|---|
| AU | 3733699 | | 12/2000 | |
| DE | 4410934 | | 10/1994 | |
| EP | 0396325 | | 11/1990 | |
| JP | 2-291429 | | 12/1990 | |
| JP | 05215001 A | * | 8/1993 | F02D/43/00 |
| JP | 7-310554 | | 11/1995 | |
| WO | 00/071859 | | 11/1999 | |

* cited by examiner

Primary Examiner—Thomas Denion
Assistant Examiner—Ching Chang
(74) Attorney, Agent, or Firm—Wenderoth, Lind & Ponack, L.L.P.

(57) ABSTRACT

In the present apparatus, a bypass exhaust pipe which communicates between the cylinder bore and the exhaust passage is disposed in the region of bottom dead center of the piston in an engine that comprises a piston that performs a reciprocating motion between top dead center and bottom dead center inside a cylinder bore, electromagnetic actuators which use an electromagnetic force to open and close an intake valve and an exhaust valve that open and close a combustion chamber, and an exhaust passage. As a result, in an engine in which the intake and exhaust valves are opened and closed by an electromagnetic driving mechanism, the opening and closing of the exhaust valve by an electromagnetic urging force can be securely and accurately performed at a specified timing without increasing the size or cost of the apparatus.

18 Claims, 7 Drawing Sheets

INTERNAL COMBUSTION ENGINE WITH EXHAUST GAS CONTROL DEVICE

BACKGROUND OF THE INVENTION

1. Field of the Invention

The present invention relates to an exhaust control device for an internal combustion engine which controls the discharge of combustion gases from the interior of the cylinder bore, and more particularly relates to an exhaust control device for an internal combustion engine which controls the discharge of combustion gases from the interior of the cylinder bore in an internal combustion engine equipped with an electromagnetic driving mechanism that uses electromagnetic force to drive the valves that open and close the combustion chamber.

2. Description of the Related Art

Electromagnetic driving mechanisms that perform direct driving by means of electromagnetic force instead of using a mechanism consisting of a cam shaft, timing belt and the like have been developed as mechanisms that drive the intake valves that open and close the intake ports that conduct intake air into the combustion chambers of internal combustion engines, and the exhaust valves that open and close the exhaust ports that discharge combustion gases from such combustion chambers.

For example, the engines disclosed in Japanese Patent Application Laid-Open No. H10-141028, Japanese Patent Application Laid-Open No. H8-189315 and the like are known as internal combustion engines equipped with such an electromagnetic driving mechanism. In the electromagnetic driving mechanisms disclosed in these patents, when the piston is lowered through the cylinder bore during the intake stroke, the intake valve is driven in the valve-opening direction by an electromagnetic force at a specified timing, so that the intake port is opened and fresh air is supplied to the cylinder bore and interior of the combustion chamber via this intake port.

Furthermore, when the piston rises through the cylinder bore during the exhaust stroke, the exhaust valve is driven in the valve-opening direction by an electromagnetic force at a specified timing, so that the exhaust port is opened, and burned gases (exhaust gases) are discharged into the atmosphere from this exhaust port via the exhaust manifold (exhaust passage).

In the driving by means of this electromagnetic force, the opening-and-closing timing of the intake valve and exhaust valve can be freely set, so that the maximum volumetric efficiency can theoretically be obtained throughout the entire rotational region of the engine.

In the exhaust stroke of the engine, the residual pressure of the combustion gases inside the cylinder bore is (for example) approximately 0.6 MPa. Accordingly, when the combustion gases are discharged, the electromagnetic driving mechanism must generate a large electromagnetic force in order to overcome the pressure of these combustion gases and drive the exhaust valve in the valve-opening direction.

Specifically, in order to overcome the pushing force exerted by these combustion gases in the valve-closing direction, and thus open the exhaust valve, the electromagnetic driving mechanism on the exhaust valve side must be increased in size compared to the electromagnetic driving mechanism on the intake valve side, or else the driving current that is supplied must be increased, so that the size of the device as a whole is increased.

Furthermore, since this electromagnetic driving mechanism on the exhaust valve side cannot be used in common with the electromagnetic driving mechanism that drives the intake valve, the cost of the device is increased.

The present invention was devised in light of the abovementioned problems encountered in the prior art; it is an object of the present invention to provide an exhaust control device for an internal combustion engine which can accomplish the opening-and-closing driving of the exhaust valve by means of an electromagnetic force securely and accurately at a specified timing, without increasing the size or cost of the apparatus.

SUMMARY OF THE INVENTION

The exhaust control device for an internal combustion engine provided by the present invention is an exhaust control device for an internal combustion engine comprising a piston that performs a reciprocating motion between top dead center and bottom dead center inside a cylinder bore, an intake valve and exhaust valve that open and close a combustion chamber positioned above the cylinder bore, an electromagnetic driving mechanism which performs opening-and-closing driving of at least the exhaust valve by means of an electromagnetic force, and an exhaust passage which conducts the exhaust that is discharged by the opening of the exhaust valve, which is characterized in that this exhaust control device has a bypass exhaust passage that communicates between the cylinder bore and the exhaust passage in the region of bottom dead center of the abovementioned piston.

In the abovementioned construction, when the piston is positioned in the region of bottom dead center in the exhaust stroke in which the piston moves from the region of bottom dead center to the region of top dead center, combustion gases at a relatively high pressure are discharged into the exhaust passage via the bypass exhaust passage.

Accordingly, the pressure of the combustion gases pushing the exhaust valve in the valve-closing direction is correspondingly reduced, so that the exhaust valve can be securely driven in the valve-opening direction at a specified timing by the subsequently applied electromagnetic force.

Furthermore, the exhaust control device for an internal combustion engine provided by the present invention is an exhaust control device for an internal combustion engine comprising a piston that performs a reciprocating motion between top dead center and bottom dead center inside a cylinder bore, an intake valve and exhaust valve that open and close a combustion chamber positioned above the cylinder bore, an electromagnetic driving mechanism which performs opening-and-closing driving of at least the exhaust valve by means of an electromagnetic force, and an exhaust passage which conducts the exhaust that is discharged by the opening of the exhaust valve, which is characterized in that this exhaust control device has a bypass exhaust passage that communicates between the cylinder bore and the exhaust passage in the region of bottom dead center of the abovementioned piston, and a control valve that controls the opening and closing of this bypass exhaust passage.

In the abovementioned construction, when the piston is positioned in the region of bottom dead center in the exhaust stroke in which the piston moves from the region of bottom dead center to the region of top dead center, combustion gases at a relatively high pressure are conducted to the upstream side of the control valve via the bypass exhaust passage. Then, as a result of this control valve opening at a specified timing, the cylinder bore and exhaust passage are caused to communicate with each other, so that the above-mentioned combustion gases are discharged into the exhaust passage.

Accordingly, the pressure of the combustion gases pushing the exhaust valve in the valve-closing direction is correspondingly reduced, so that the exhaust valve can be securely driven in the valve-opening direction at a specified timing by the subsequently applied electromagnetic force.

Furthermore, the sucking through of fresh air or the like in the intake stroke can be prevented by opening the control valve only during the exhaust stroke.

In the abovementioned construction, a construction may be employed in which the control valve is a check valve that allows the flow of gases only from the cylinder bore toward the exhaust passage.

In the abovementioned construction, since the control valve is a check valve, the combustion gases (exhaust gases) discharged toward the exhaust passage from the cylinder bore are prevented from flowing back toward the cylinder bore. As a result, the discharge of combustion gases is securely performed.

In the abovementioned construction, a construction may be employed in which the control valve is driven in the valve-closing direction by a preset specified urging force.

In the abovementioned construction, when the pressure of the combustion gases inside the cylinder bore reaches a specified level or greater, the control valve is moved in the valve-opening direction by the pressure of the combustion gases against the urging force that closes the control valve. As a result, a portion of the combustion gases is discharged, so that the application of a combustion gas pressure exceeding a specified level to the exhaust valve can be prevented, and the exhaust valve can be securely driven in the valve-opening direction at a specified timing.

In the abovementioned construction, a construction may be employed in which opening-and-closing driving of the control valve is accomplished by means of control signals that correspond to the operating conditions of the internal combustion engine.

In the abovementioned construction, the opening-and-closing operation of the control valve is accomplished in accordance with the operating conditions of the internal combustion engine. Accordingly, the opening-and-closing timing of the control valve and the timing at which high-pressure combustion gases are discharged via the bypass combustion passage can easily be set at a desired timing, so that fine exhaust control can be performed in accordance with the operating conditions of the internal combustion engine.

DESCRIPTION OF THE PREFERRED EMBODIMENTS

Embodiments of the present invention will be described below with reference to the attached figures.

Figure 1:
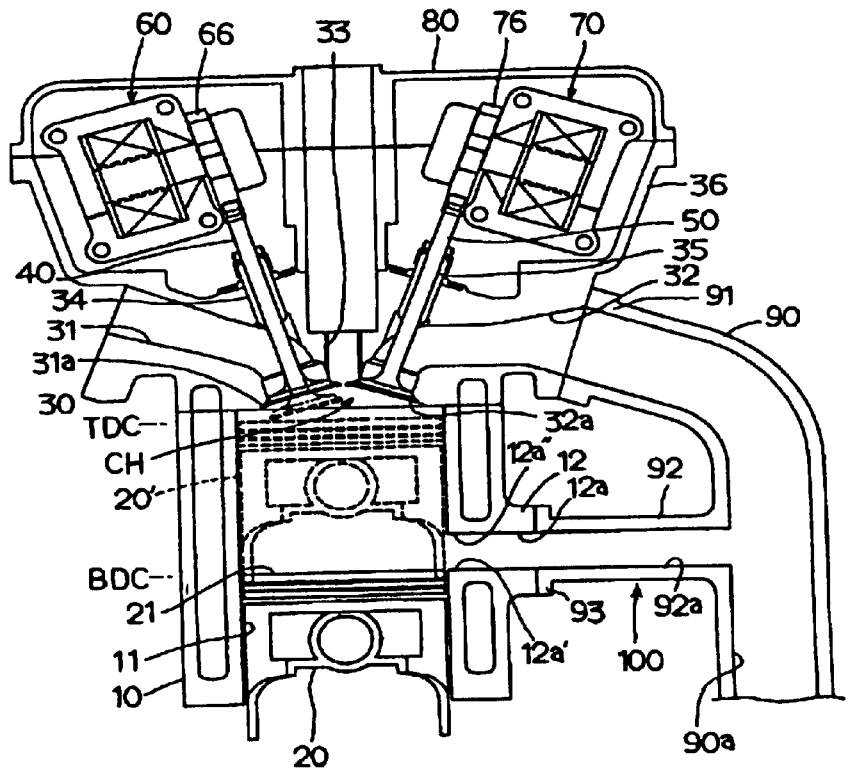
FIG. 1 is a sectional view which shows the schematic construction of an internal combustion engine equipped with the exhaust control device of the present invention.
Figure 2:
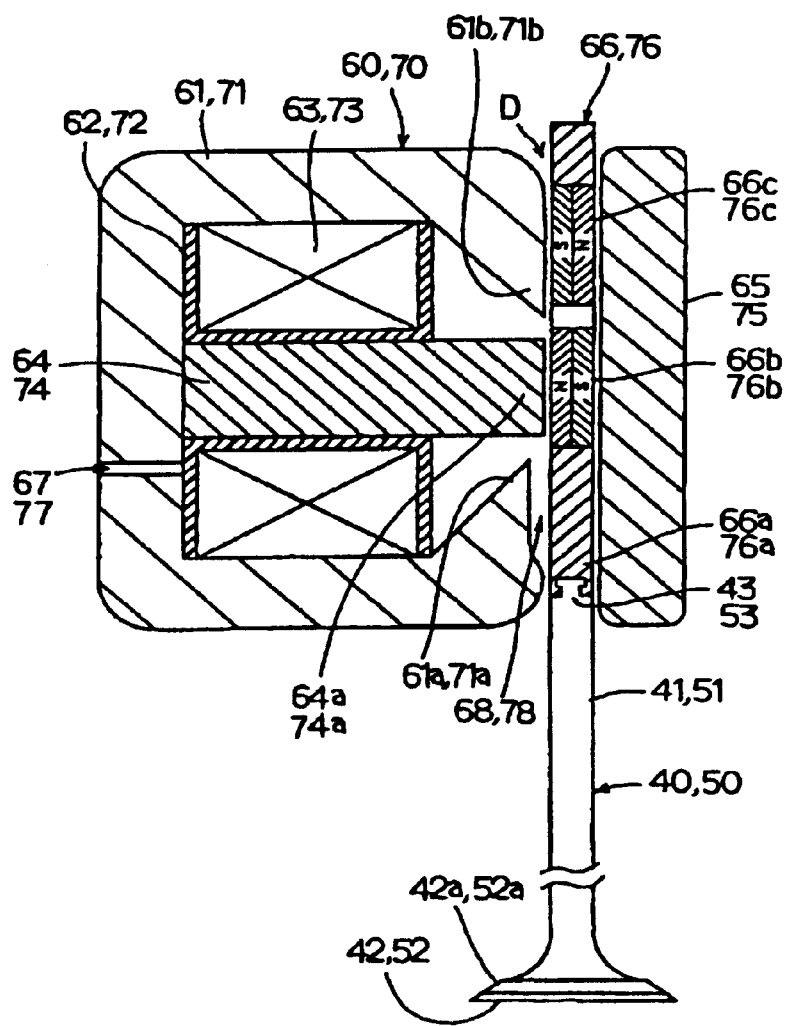
FIG. 2 is a sectional view which shows the schematic construction of the electromagnetic actuator in the internal combustion engine shown in FIG. 1.

FIG. 1 is a partial sectional view of a four-cycle internal combustion engine equipped with an exhaust control device constituting one embodiment of the present invention. FIG. 2 is a sectional view which shows the schematic construction of the electromagnetic driving mechanism that performs opening-and-closing driving of the intake valve and exhaust valve.

As is shown in FIG. 1, the engine equipped with the exhaust control device of the present embodiment comprises as basic constituent elements a cylinder block 10 in which a cylinder bore 11 is formed, a piston 20 which is disposed so that this piston 20 performs a reciprocating motion in the vertical direction through the interior of the abovementioned cylinder bore 11, a cylinder head 30 which is joined to the upper end of the cylinder block 10, and in which an intake port 31 and an exhaust port 32 are formed, an intake valve 40 which opens and closes the intake port 31, an exhaust valve 50 which opens and closes the exhaust port 32, an electromagnetic actuator 60 used as an electromagnetic driving mechanism that drives the intake valve 40, an electromagnetic actuator 70 used as an electromagnetic driving mechanism that drives the exhaust valve 50, a cylinder head cover 80 that covers the top of the cylinder head 30, an exhaust manifold 90 which is connected to the exhaust port 32, and which demarcates an exhaust passage, and a bypass exhaust pipe 100 which demarcates a bypass exhaust passage that establishes communication between the cylinder bore 11 and exhaust manifold 90.

Here, the piston 20 performs a reciprocating motion between bottom dead center (BDC) positioned at the lower end of the cylinder bore 11 and top dead center (TDC) positioned at the upper end of the cylinder bore 11 in the intake, compression, expansion and exhaust strokes of the engine. Furthermore, in FIG. 1, states are shown in which the piston 20 indicated by a solid line is positioned at bottom dead center (BDC), and the piston 20' indicated by a dotted line is positioned at top dead center (TDC).

A combustion chamber CH which communicates with the intake port 31 that introduces intake air and the exhaust port 32 that discharges combustion gases, and which is positioned at the top of the cylinder bore 11, is formed in the region of the undersurface of the cylinder head 30. Furthermore, a spark plug hole 33 used for the attachment of a spark plug (not shown in the figures) is formed in a region that extends perpendicularly from roughly the central portion so that this spark plug hole 33 communicates with the combustion chamber CH.

Furthermore, an intake valve guide 34 which guides the intake valve 40 in the direction of reciprocating motion is mounted in the region above the intake port 31, and an exhaust valve guide 35 which guides the exhaust valve 50 in the direction of reciprocating motion is mounted in the region above the exhaust port 32. Moreover, the electromagnetic actuator 60 that drives the intake valve 40 by means of an electromagnetic force and the electromagnetic actuator 70 that drives the exhaust valve 50 by means of an electromagnetic force are disposed in an upper space surrounded by the outer walls 36 of the cylinder head 30, and a cylinder head cover 80 is attached so that these electromagnetic actuators 60 and 70 are covered.

As is shown in FIG. 2, the intake valve 40 is formed by a valve stem 41 and a valve head 42 that is positioned on the tip end of this valve stem 41, and the upper end portion 43 of the valve stem 41 is detachably connected to one end portion 66a of a movable member 66 of the electromagnetic actuator 60 (described later). Furthermore, a valve seat surface 42a is formed on the upper side of the valve head 42, and the intake port 31 is opened and closed by the seating of this valve seat surface 42a on the valve seat 31a (see FIG. 1) of the intake port 31, and the separation of this valve seat surface 42a from the valve seat 31a.

As is shown in FIG. 2, the exhaust valve 50 is formed by a valve stem 51 and a valve head 52 that is positioned on the tip end of this valve stem 51, and the upper end portion 53 of the valve stem 51 is detachably connected to one end portion 76a of a movable member 76 of the electromagnetic actuator 70 (described later). Furthermore, a valve seat surface 52a is formed on the upper side of the valve head 52, and the exhaust port 32 is opened and closed by the seating of this valve seat surface 52a on the valve seat 32a (see FIG. 1) of the exhaust port 32, and the separation of this valve seat surface 52a from the valve seat 32a.

Specifically, the exhaust valve 50 has a construction that is substantially similar to that of the intake valve 40, except for the fact that the external diameter of the valve head 52 is smaller than the external diameter of the valve head 42, and the fact that the materials used are different.

As is shown in FIGS. 1 and 2, the electromagnetic actuator 60 that drives the intake valve 40 is constructed from a yoke 61 which is substantially C-shaped in cross section and which forms a magnetic path, a bobbin 62 consisting of a nonmagnetic material such as a synthetic resin or the like which is disposed on the inside of this yoke 61, an excitation coil 63 which is wound around this bobbin 62 in an annular configuration, a core 64 which is disposed in the central portion of the bobbin 62, three magnetic pole parts 61a, 61b and 64a in which magnetic poles are formed by the powering of the coil 63, a yoke 65 which acts in conjunction with the abovementioned magnetic pole parts 61a, 61b and 64a to form a magnetic path which is disposed so as to demarcate a specified gap D, a movable member 66 which is disposed so that this movable member 66 is free to perform a reciprocating motion in this gap D, and magnetic gaps 67 and 68.

A connecting part (not shown in the figures) which can detachably connect the upper end portion 43 of the intake valve 40 is formed on one end portion 66a of the abovementioned movable member 66; furthermore, permanent magnet pieces 66b and 66c are mounted in the main region position in the abovementioned gap D so that these permanent magnet pieces 66b and 66c can be caused to face the magnetic pole parts 61a, 61b and 64a and yoke 65.

As is shown in FIG. 2, these permanent magnet pieces 66b and 66c are formed so that the polarities of the respective magnetizing surfaces are the opposite of each other, i.e., these permanent magnet pieces are formed so that the magnetizing surface of the permanent magnet piece 66b has an N pole→S pole arrangement, while the magnetizing surface of the permanent magnet piece 66c has an S pole→N pole arrangement.

In a state in which no current is supplied to the coil 63 in the electromagnetic actuator 60 constructed as described above, the magnetic resistance of the magnetic gaps 67 and 68 is large relative to the magnetic force of the permanent magnet pieces 66b and 66c; accordingly, a magnetic path which follows the route of permanent magnet piece 66b (N pole)→magnetic pole part 64a→core 64→yoke 61→magnetic pole part 61b→permanent magnet piece 66c (S pole)→permanent magnet piece 66c (N pole)→yoke 65→permanent magnet piece 66b (S pole) is formed. As is shown in FIG. 2, the movable member 66 is positioned so that this member is offset in an upper resting position. When the movable member 66 is positioned in this resting position, the intake valve 40 that is connected to the end portion 66a of the movable member 66 is positioned in a state that closes the intake port 31.

Meanwhile, when an electric current at a specified level is supplied to the coil 63 in a specified direction, magnetic flux also passes through the magnetic gaps 67 and 68, so that a magnetic path which follows the route of permanent magnet piece 66b (N pole)→magnetic gap 68→magnetic pole part 61a→yoke 61→magnetic gap 67→yoke 61→core 64→magnetic pole part 64a→permanent magnet piece 66c (S pole)→permanent magnet piece 66c (N pole)→yoke 65→permanent magnet piece 66b (S pole), and a magnetic path which follows the route of permanent magnet piece 66b (N pole)→magnetic gap 68→magnetic pole part 61a→yoke 61→magnetic gap 67→yoke 61→magnetic pole part 61b, permanent magnet piece 66c (S pole)→permanent magnet piece 66c (N pole)→yoke 65→permanent magnet piece 66b (S pole), are formed, and the movable member 66 is moved toward the lower operating position.

Furthermore, when the current that is supplied to the coil 63 is increased, only a magnetic path which follows the route of permanent magnet piece 66b (N pole)→magnetic gap 68→magnetic pole part 61a→yoke 61→magnetic gap 67→yoke 61→core 64→magnetic pole part 64a→permanent magnet piece 66c (S pole)→permanent magnet piece 66c (N pole)→yoke 65→permanent magnet piece 66b (S pole) is formed, and the movable member 66 is moved even further toward the lower operating position.

As a result of the movement of this movable member 66 toward the operating position, the intake valve 40 connected to the end portion 66a is positioned in a state that opens the intake port 31 (valve-opening position).

As is shown in FIGS. 1 and 2, the electromagnetic actuator 70 that drives the exhaust valve 50 is constructed from a yoke 71 which is substantially C-shaped in cross section and which forms a magnetic path, a bobbin 72 consisting of a nonmagnetic material such as a synthetic resin or the like which is disposed on the inside of this yoke 71, an excitation coil 73 which is wound around this bobbin 72 in an annular configuration, a core 74 which is disposed in the central portion of the bobbin 72, three magnetic pole parts 71a, 71b and 74a in which magnetic poles are formed by the powering of the coil 73, a yoke 75 which acts in conjunction with the abovementioned magnetic pole parts 61a, 61b and 64a to form a magnetic path which is disposed so as to demarcate a specified gap D, a movable member 76 which is disposed so that this movable member 76 is free to perform a reciprocating motion in this gap D, and magnetic gaps 77 and 78.

A connecting part (not shown in the figures) which can detachably connect the upper end portion 53 of the exhaust valve 50 is formed on one end portion 76a of the abovementioned movable member 76; furthermore, permanent magnet pieces 76b and 76c are mounted in the main region position in the abovementioned gap D so that these permanent magnet pieces 76b and 76c can be caused to face the magnetic pole parts 71a, 71b and 74a and yoke 75.

As is shown in FIG. 2, these permanent magnet pieces 76b and 76c are formed so that the polarities of the respective magnetizing surfaces are the opposite of each other, i.e., these permanent magnet pieces are formed so that the magnetizing surface of the permanent magnet piece 76b has an N pole→S pole arrangement, while the magnetizing surface of the permanent magnet piece 76c has an S pole→N pole arrangement.

In a state in which no current is supplied to the coil 73 in the electromagnetic actuator 70 constructed as described above, the magnetic resistance of the magnetic gaps 77 and 78 is large relative to the magnetic force of the permanent magnet pieces 76b and 76c; accordingly, a magnetic path which follows the route of permanent magnet piece 76b (N pole)→magnetic pole part 74a→core 74→yoke 71, magnetic pole part 71b→permanent magnet piece 76c (S pole)→permanent magnet piece 76c (N pole)→yoke 75→permanent magnet piece 76b (S pole) is formed. As is shown in FIG. 2, the movable member 76 is positioned so that this member is offset in an upper resting position. When the movable member 76 is positioned in this resting position, the exhaust valve 50 that is connected to the end portion 76a of the movable member 76 is positioned in a state that closes the exhaust port 32.

Meanwhile, when an electric current at a specified level is supplied to the coil 73 in a specified direction, magnetic flux also passes through the magnetic gaps 77 and 78, so that a magnetic path which follows the route of permanent magnet piece 76b (N pole)→magnetic gap 78→magnetic pole part 71a→yoke 71→magnetic gap 77→yoke 71→core 74→magnetic pole part 74a→permanent magnet piece 76c (S pole)→permanent magnet piece 76c (N pole)→yoke 75→permanent magnet piece 76b (S pole), and a magnetic path which follows the route of permanent magnet piece 76b (N pole)→magnetic gap 78→magnetic pole part 71a→yoke 71→magnetic gap 77→yoke 71→magnetic pole part 71b, permanent magnet piece 76c (S pole)→permanent magnet piece 76c (N pole)→yoke 75→permanent magnet piece 76b (S pole), are formed, and the movable member 76 is moved toward the lower operating position.

Furthermore, when the current that is supplied to the coil 73 is increased, only a magnetic path which follows the route of permanent magnet piece 76b (N pole)→magnetic gap 78→magnetic pole part 71a→yoke 71→magnetic gap 77→yoke 71→core 74→magnetic pole part 74a→permanent magnet piece 76c (S pole)→permanent magnet piece 76c (N pole)→yoke 75→permanent magnet piece 76b (S pole) is formed, and the movable member 76 is moved even further toward the lower operating position.

As a result of the movement of this movable member 76 toward the operating position, the exhaust valve 50 connected to the end portion 76a is positioned in a state that opens the exhaust port 32 (valve-opening position).

As was described above, the electromagnetic actuator 60 that drives the intake valve 40 and the electromagnetic actuator 70 that drives the exhaust valve 50 have more or less the same construction, so that the parts of these actuators can be used in common. Accordingly, as a result of this common use of parts, the cost can be reduced.

Furthermore, in the driving of these electromagnetic actuators 60 and 70, the operating conditions of the engine are first judged on the basis of information detected by various types of sensors such as a crank angle sensor that detects the rotational angle of the crankshaft, a water temperature sensor that detects the temperature of the cooling water, an intake air pressure sensor that detects the pressure of the intake air, an air flow sensor that detects the flow rate of the intake air, an oxygen sensor that detects the amount of oxygen inside the exhaust manifold 90, and the like. Then, on the basis of this judgement information and a driving map or the like that is stored beforehand in memory means such as a ROM or the like, specified control signals are output from a control part (CPU), and driving is performed at a specified timing in accordance with these output control signals.

One end portion 91 of the exhaust manifold 90 is connected to the cylinder head 30 by bolts and nuts or the like, so that the exhaust port 32 and exhaust passage 90a are caused to communicate with each other, and exhaust (combustion gases) is discharged into the exhaust passage 90a via the exhaust port 32 as a result of the opening of the exhaust valve 50 (valve opening). Furthermore, the other end portion (not shown in the figures) of the exhaust manifold 90 is connected to a muffler via a catalytic device or the like. Moreover, a branch exhaust pipe 92 is formed at an intermediate point in the exhaust manifold 90, and the end portion 93 of this branch exhaust pipe 92 is connected by means of bolts and nuts or the like to a flange part 12 formed on the cylinder block 10, so that the branch passage 92a and a bypass exhaust port 12a that communicates with the cylinder bore 11 are caused to communicate with each other.

The abovementioned bypass exhaust port 12a is formed in a position which is such that the cylinder bore 11 is caused to communicate with the branch passage 92a, i.e., the exhaust passage 90a, when the piston 20 is positioned at bottom dead center (BDC). Here, as is shown in FIG. 1, the position in which this bypass exhaust port 12a is formed may be a position in the vicinity of bottom dead center (BDC) of the piston 20, e.g., a position which is such that the upper surface 21 of the piston 20 positioned at bottom dead center (BDC) and the lower inner wall surface 12a' of the bypass exhaust port 12a are in the same plane, or a position which is such that the lower inner wall surface 12a' of the bypass exhaust port 12a is offset slightly upward from the upper surface 21 of the piston 20. Furthermore, a circular shape or an elliptical shape that is flattened in the direction perpendicular to the direction of the reciprocating motion of the piston 20 may be used as the cross-sectional shape of the bypass exhaust port 12a.

A bypass exhaust passage which communicates between the cylinder bore 11 and the exhaust passage 90a is formed by the abovementioned bypass exhaust port 12a and branch passage 92a, and a bypass exhaust pipe 100 which demarcates a bypass exhaust passage is formed by a branch exhaust pipe 92 and the portion of the cylinder block 10 that demarcates the abovementioned bypass exhaust port 12a. Furthermore, the abovementioned branch exhaust pipe 92 is formed as an integral part of the exhaust manifold 90; however, a construction in which this pipe is formed as a separate part and subsequently connected to the exhaust manifold may also be used.

Next, the operation of the engine equipped with the exhaust control device of the present invention will be described.

First, in the intake stroke, a specified current is supplied to the coil 63 of the electromagnetic actuator 60, so that the movable member 66 moves the intake valve 40 to the open-valve position. As a result, the interior of the cylinder bore 11 is filled with fresh air and mist-form fuel via the intake port 31. Subsequently, when the direction of current flow through the coil 63 is reversed, the movable member 66 moves toward the resting position, and moves the intake valve 40 to the closed-valve position.

Then, in the compression stroke, the piston 20 moves through the interior of the cylinder bore 11 from bottom dead center (BDC) toward top dead center (TDC), and the mixture is ignited by the spark plug at a specified timing, so that there is a shift to the expansion stroke.

In the expansion stroke, the piston 20 moves through the interior of the cylinder bore 11 from top dead center (TDC) toward bottom dead center (BDC), and this kinetic energy is converted into the rotational force of the crankshaft.

Then, in the exhaust stroke, when the piston 20 is positioned in the vicinity of bottom dead center (BDC), the cylinder bore 11 and exhaust manifold 90 communicate via the bypass exhaust pipe 100; accordingly, high-pressure combustion gases (exhaust gases) are first discharged into the exhaust manifold 90 via the abovementioned bypass exhaust pipe 100. Specifically, combustion gases are discharged directly into the exhaust manifold 90 from the cylinder bore 11 without passing through the exhaust port 32 that is opened and closed by the exhaust valve 50.

Then, as the piston 20 rises from bottom dead center (BDC) toward top dead center (TDC), a specified current is supplied to the coil 73 of the electromagnetic actuator 70 at a specified timing, so that the movable member 76 moves the exhaust valve 50 into the open-valve position. In this case, when the piston 20 rises so that the upper surface 21 of the piston 20 moves to a point that is higher than the upper inner wall surface 12a" of the bypass exhaust port 12a, the discharge of combustion gases via the bypass exhaust pipe 100 is blocked, so that the combustion gases are discharged into the exhaust manifold 90 via the exhaust port 32.

At the point in time at which the exhaust valve 50 is driven in the valve-opening direction by the electromagnetic actuator 70, a portion of the combustion gases has already been discharged via the bypass exhaust pipe 100; accordingly, the residual pressure of the combustion gases that pushes the exhaust valve 50 in the valve-closing direction has dropped. Consequently, the load that is applied to the electromagnetic actuator 70 is correspondingly lightened, so that the exhaust valve 50 is securely opened at a specified timing by the above mentioned electromagnetic actuator 70. As a result, the combustion gases are securely discharged into the exhaust manifold 90 via the exhaust port 32.

Furthermore, even in cases where the exhaust valve 50 fails to open as a result of trouble with the electromagnetic actuator 70 or the like, a portion of the combustion gases is securely discharged via the bypass exhaust pipe 100, so that a "limp home" function can be ensured.

Figure 3:
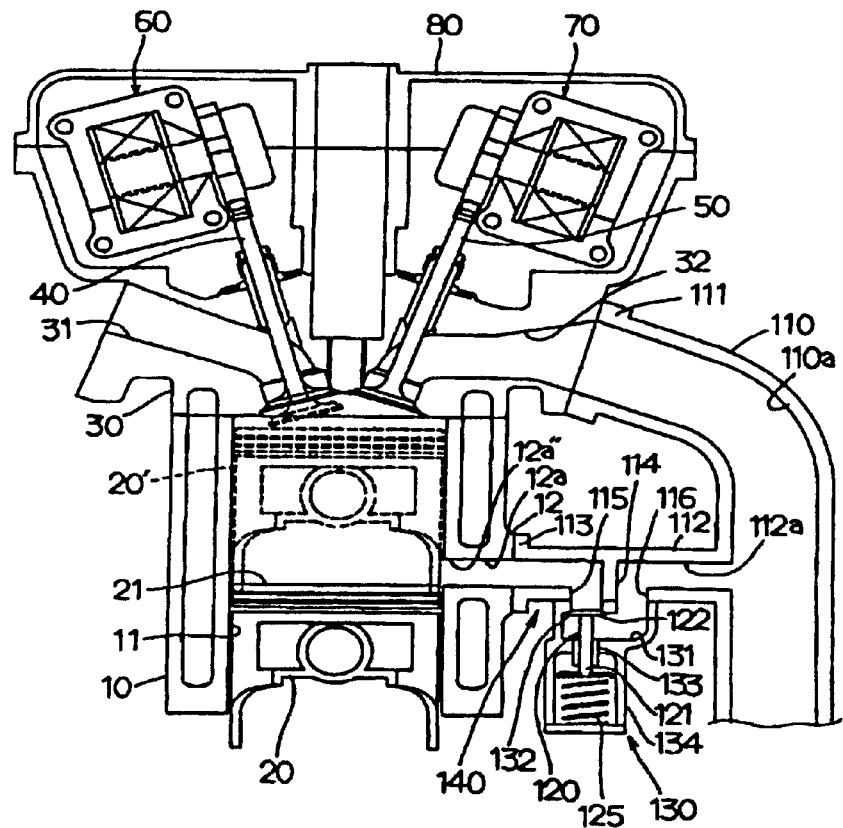
FIG. 3 is a sectional view which shows another embodiment of the exhaust control device of the present invention.

FIG. 3 shows an engine equipped with an exhaust control device that constitutes another embodiment of the present invention. This embodiment has a construction similar to that of the embodiment shown in FIG. 1, except for the fact that a control valve is provided. One end portion 111 of the exhaust manifold 110 of the engine of this embodiment is connected by bolts and nuts or the like to the cylinder head 30, so that the exhaust port 32 and exhaust passage 110a are caused to communicate with each other. Exhaust gases (combustion gases) are discharged into the exhaust passage 110a via the exhaust port 32 as a result of the opening of the exhaust valve 50. Furthermore, the other end portion (not shown in the figures) of the exhaust manifold 110 is connected to a muffler via a catalytic device or the like.

Furthermore, a branch exhaust pipe 112 is formed at an intermediate point in the exhaust manifold 110, and the end portion 113 of this branch exhaust pipe 112 is connected by means of bolts and nuts or the like to a flange part 12 formed on the cylinder block 10. Moreover, a partition wall 114 is disposed at an intermediate point in the branch passage 112a demarcated by the branch exhaust pipe 112, and two opening parts 115 and 116 are formed with this partition wall 114 as a boundary.

Furthermore, a valve case 130 which holds a control valve 120 is connected using bolts and nuts or the like to the branch exhaust pipe 112 in the region of the opening parts 115 and 116. A U-shaped passage 131 which is formed so that this passage communicates with the opening parts 115 and 116, a valve seat part 132 which is formed on the side that communicates with the opening part 115, a valve guide 133 which guides the control valve 120 so that the control valve 120 is free to perform a reciprocating motion, and a spring accommodating part 134 which accommodates an urging spring 125 that is engaged with one end portion of the control valve 120, are formed in the abovementioned valve case 130.

The control valve 120 is driven by the urging spring 125 that is engaged with one end portion 121 of this control valve 120 so that the valve part 122 is seated on the valve seat part 132, thus closing off the U-shaped passage 131 under ordinary conditions. Specifically, this control valve 120 is formed as a check valve that allows flow only from the cylinder bore 11 toward the exhaust passage 110a via the bypass exhaust port 12a.

Furthermore, the control valve 120 is driven in the valve-closing direction by the urging spring 125, which has a preset urging force; accordingly, when the pressure on the side of the cylinder bore 11 (upstream side of the control valve 120) exceeds the pressure on the side of the exhaust passage 110a (downstream side of the control valve 120) by a specified level or greater, the control valve 120 is opened by this pressure difference. Here, it is desirable that the urging force of the urging spring 125 be set at a value which is such that the control valve 120 is opened by the residual pressure inside the cylinder bore 11 when the piston 20 is positioned in the vicinity of bottom dead center (BDC).

A bypass exhaust passage which communicates between the cylinder bore 11 and the exhaust passage 110a is formed by the abovementioned bypass exhaust port 12a, branch passage 92a and U-shaped passage 131, and a bypass exhaust pipe 140 that demarcates a bypass exhaust passage is formed by the bypass exhaust pipe 112 and the portion of the cylinder block 10 that demarcates the abovementioned bypass exhaust port 12a. Furthermore, the abovementioned bypass exhaust pipe 112 is formed as an integral part of the exhaust manifold 110; however, it would also be possible to use a construction in which this bypass exhaust port 112 is formed as a separate part and subsequently connected to the exhaust manifold.

Next, the operation of the engine equipped with the exhaust control device of the present embodiment will be described. First, in the intake stroke, a specified current is supplied to the coil 63 of the electromagnetic actuator 60 so that the movable member 66 moves the intake valve 40 into the open-valve position. As a result, the interior of the cylinder bore 11 is filled with fresh air and mist-form fuel via the intake port 31. Subsequently, when the direction of current flow through the coil 63 is reversed, the movable member 66 moves toward the resting position, and moves the intake valve 40 to the closed-valve position.

In this intake stroke, the control valve 120 is driven by the urging spring 125 so that the control valve 120 does not open. Accordingly, the fresh air and mist-form fuel introduced into the cylinder bore 11 are securely accumulated inside the cylinder bore 11 without being blown out toward the exhaust passage 110a.

Then, in the compression stroke, the piston 20 moves through the interior of the cylinder bore 11 from bottom dead center (BDC) toward top dead center (TDC), and the mixture is ignited by the spark plug at a specified timing, so that there is a shift to the expansion stroke.

In the expansion stroke, the piston 20 moves through the interior of the cylinder bore 11 from top dead center (TDC) toward bottom dead center (BDC), and this kinetic energy is converted into the rotational force of the crankshaft.

Then, in the exhaust stroke, when the piston 20 is positioned in the vicinity of bottom dead center (BDC), the control valve 120 is opened against the urging force of the urging spring 125. As a result, the cylinder bore 11 and exhaust manifold 110 communicate with each other via the bypass exhaust pipe 140, so that high-pressure combustion gases (exhaust gases) are first discharged into the exhaust manifold 110 via the abovementioned bypass exhaust pipe 140. Specifically, combustion gases are discharged directly into the exhaust manifold 110 from the cylinder bore 11 without passing through the exhaust port 32 that is opened and closed by the exhaust valve 50. Then, when the residual pressure inside the cylinder bore 11 drops below a specified level, the control valve 120 is caused to move to the closed-valve position, i.e., the resting position, by the urging force of the urging spring 125, so that the bypass exhaust passage is closed off.

Next, as the piston 20 rises from bottom dead center (BDC) toward top dead center (TDC), a specified current is supplied to the coil 73 of the electromagnetic actuator 70 at a specified timing, so that the movable member 76 moves the exhaust valve 50 into the open-valve position. Then, combustion gases (exhaust gases) are discharged into the exhaust manifold 110 via the opened exhaust port 32. Furthermore, at the point in time at which the upper surface 21 of the piston 20 moves to a point that is higher than the upper inner wall surface 12a" of the bypass exhaust port 12a during the rise of the piston 20, the discharge of combustion gases via the bypass exhaust pipe 140 is blocked; accordingly, the urging force of the urging spring 125 may be set so that the control valve 120 is closed after this.

At the point in time at which the exhaust valve 50 is driven in the valve-opening direction by the electromagnetic actuator 70, a portion of the combustion gases has already been discharged via the bypass exhaust pipe 140; accordingly, the residual pressure of the combustion gases that pushes the exhaust valve 50 in the valve-closing direction has dropped. Consequently, the load that is applied to the electromagnetic actuator 70 is correspondingly lightened, so that the exhaust valve 50 is securely opened at a specified timing by the abovementioned electromagnetic actuator 70. As a result, the combustion gases are securely discharged into the exhaust manifold 110 ink via the exhaust port 32.

Furthermore, even in cases where the exhaust valve 50 fails to open as a result of trouble with the electromagnetic actuator 70 or the like, a portion of the combustion gases is securely discharged via the bypass exhaust pipe 140, so that a "limp home" function can be ensured.

Figure 4:
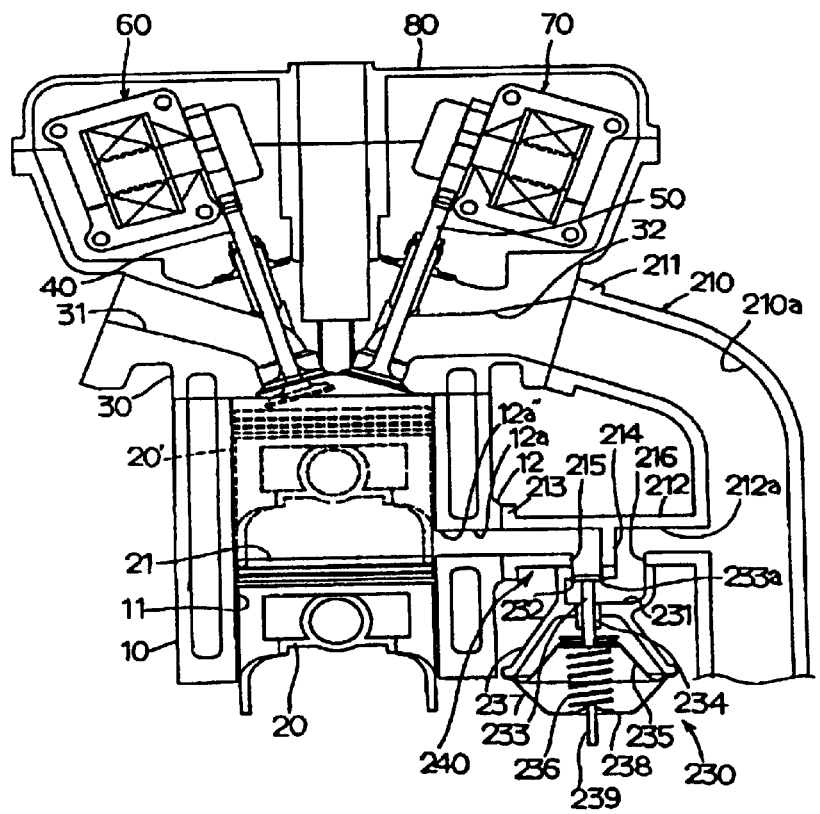
FIG. 4 is a sectional view which shows another embodiment of the exhaust control device of the present invention.

FIG. 4 shows an engine equipped with an exhaust control device that constitutes another embodiment of the present invention. This embodiment has a construction similar to that of the embodiment shown in FIG. 3, except for the fact that the control valve is opened and closed in accordance with control signals corresponding to the operating conditions of the engine.

One end portion 211 of the exhaust manifold 210 of the engine of this embodiment is connected by bolts and nuts or the like to the cylinder head 30, so that the exhaust port 32 and exhaust passage 210a are caused to communicate with each other. Exhaust gases (combustion gases) are discharged into the exhaust passage 210a via the exhaust port 32 as a result of the opening of the exhaust valve 50. Furthermore, the other end portion (not shown in the figures) of the exhaust manifold 210 is connected to a muffler via a catalytic device or the like.

Furthermore, a branch exhaust pipe 212 is formed at an intermediate point in the exhaust manifold 210, and the end portion 213 of this branch exhaust pipe 212 is connected by means of bolts and nuts or the like to a flange part 12 formed on the cylinder block 10. Moreover, a partition wall 214 is disposed at an intermediate point in the branch passage 212a demarcated by the branch exhaust pipe 212, and two opening parts 215 and 216 are formed with this partition wall 214 as a boundary.

Furthermore, a diaphragm type valve 230 is connected to the branch exhaust pipe 212 by means of bolts and nuts or the like in the region of the opening parts 215 and 216. This diaphragm type valve 230 is constructed from a U-shaped passed 231 which is formed so that this passage communicates with the opening parts 215 and 216, a valve seat part 232 which is formed on the side that communicates with the opening part 215, a control valve 233 which opens and closes the U-shaped passage 231 by seating on the valve seat part 232 and separating from the valve seat part 232, a valve guide 234 which guides the control valve 233 so that the control valve 233 is free to perform a reciprocating motion, an accommodating part 237 which accommodates a diaphragm 235 that is connected to one end portion of the control valve 233 and an urging spring 236 that clamps this diaphragm 235 from the other side and exerts an urging force from the outside, a cap 238 that covers accommodating part 237, and a pipe 239 which is installed in this cap 238 and which communicates with the space demarcated by the diaphragm 235 and cap 238.

The control valve 233 is driven by the urging spring 236, which has a preset urging force, so that the valve part 233a of the control valve is seated on the valve seat part 232, thus closing off the U-shaped passage 231 under ordinary conditions. Specifically, this control valve 233 is formed as a check valve that allows flow only from the cylinder bore 11 toward the exhaust passage 210a via the bypass exhaust port 12a.

Furthermore, pressure reduction means (not shown in the figures) such as a vacuum pump or the like are connected to the pipe 239 via a connecting pipe such as a rubber hose or the like, and these pressure reduction means are driven in accordance with control signals corresponding to the operating conditions of the engine that are output from the control part.

Here, for example, the urging force of the urging spring 236 is set at a value which is such that the control valve 233 will not open even when the pressure difference between the pressure on the side of the cylinder bore 11 (upstream side of the control valve 233) and the pressure on the side of the exhaust passage 210a (downstream side of the control valve 233) is at a maximum. Then, by driving the pressure reduction means so that the diaphragm 235 is appropriately moved, the control valve 233 is opened at a specified timing in accordance with the operating conditions of the engine.

A bypass exhaust passage which communicates between the cylinder bore 11 and the exhaust passage 210a is formed by the abovementioned bypass exhaust port 12a, branch passage 212a and U-shaped passage 231, and a bypass exhaust pipe 240 that demarcates a bypass exhaust passage is formed by the bypass exhaust pipe 212 and the portion of the cylinder block 10 that demarcates the abovementioned bypass exhaust port 12a. Furthermore, the abovementioned branch passage 212 is formed as an integral part of the exhaust manifold 210; however, it would also be possible to use a construction in which this bypass exhaust port 212 is formed as a separate part and subsequently connected to the exhaust manifold.

Next, the operation of the engine equipped with the exhaust control device of the present embodiment will be described. First, in the intake stroke, a specified current is supplied to the coil 63 of the electromagnetic actuator 60 so that the movable member 66 moves the intake valve 40 into the open-valve position. As a result, the interior of the cylinder bore 11 is filled with fresh air and mist-form fuel via the intake port 31. Subsequently, when the direction of current flow through the coil 63 is reversed, the movable member 66 moves toward the resting position, and moves the intake valve 40 to the closed-valve position.

In this intake stroke, the pressure reduction means are not driven, so that the control valve 233 is maintained in the closed-valve position. Accordingly, the fresh air and mist-form fuel introduced into the cylinder bore 11 are securely accumulated inside the cylinder bore 11 without being blown out toward the exhaust passage 210a.

Then, in the compression stroke, the piston 20 moves through the interior of the cylinder bore 11 from bottom dead center (BDC) toward top dead center (TDC), and the mixture is ignited by the spark plug at a specified timing, so that there is a shift to the expansion stroke.

In the expansion stroke, the piston 20 moves through the interior of the cylinder bore 11 from top dead center (TDC) toward bottom dead center (BDC), and this kinetic energy is converted into the rotational force of the crankshaft.

Then, in the exhaust stroke, when the piston 20 is positioned in the vicinity of bottom dead center (BDC), a control signal corresponding to the operating conditions of the engine is output from the control part, and the diaphragm 235 is actuated against the urging force of the urging spring 236, so that the control valve 233 opens. As a result, the cylinder bore 11 and the exhaust manifold 210 communicate with each other via the bypass exhaust pipe 240. Then, high-pressure combustion gases (exhaust gases) are first discharged into the exhaust manifold 210 via the abovementioned bypass exhaust pipe 240.

Specifically, combustion gases are discharged directly into the exhaust manifold 210 from the cylinder bore 11 without passing through the exhaust port 32 that is opened and closed by the exhaust valve 50. Then, when the residual pressure inside the cylinder bore 11 drops below a specified level, the control valve 233 is caused to move to the closed-valve position, i.e., the resting position, by the urging force of the urging spring 236, so that the bypass exhaust passage is closed off.

Next, as the piston 20 rises from bottom dead center (BDC) toward top dead center (TDC), a specified current is supplied to the coil 73 of the electromagnetic actuator 70 at a specified timing, so that the movable member 76 moves the exhaust valve 50 into the open-valve position. Then, combustion gases (exhaust gases) are discharged into the exhaust manifold 210 via the opened exhaust port 32. Furthermore, at the point in time at which the upper surface 21 of the piston 20 moves to a point that is higher than the upper inner wall surface 12a" of the bypass exhaust port 12a during the rise of the piston 20, the discharge of combustion gases via the bypass exhaust pipe 240 is blocked; accordingly, the system may be set so that the driving of the pressure reduction means is stopped and the control valve 233 is closed after this.

At the point in time at which the exhaust valve 50 is driven in the valve-opening direction by the electromagnetic actuator 70, a portion of the combustion gases has already been discharged via the bypass exhaust pipe 240; accordingly, the residual pressure of the combustion gases that pushes the exhaust valve 50 in the valve-closing direction has dropped. Consequently, as in the abovementioned embodiments, the load that is applied to the electromagnetic actuator 70 is correspondingly lightened, so that the exhaust valve 50 is securely opened at a specified timing by the above-mentioned electromagnetic actuator 70. As a result, the combustion gases are securely discharged into the exhaust manifold 210 ink via the exhaust port 32.

Furthermore, as in the abovementioned embodiments, even in cases where the exhaust valve 50 fails to open as a result of trouble with the electromagnetic actuator 70 or the like, a portion of the combustion gases is securely discharged via the bypass exhaust pipe 240, so that a "limp home" function can be ensured.

Figure 5:
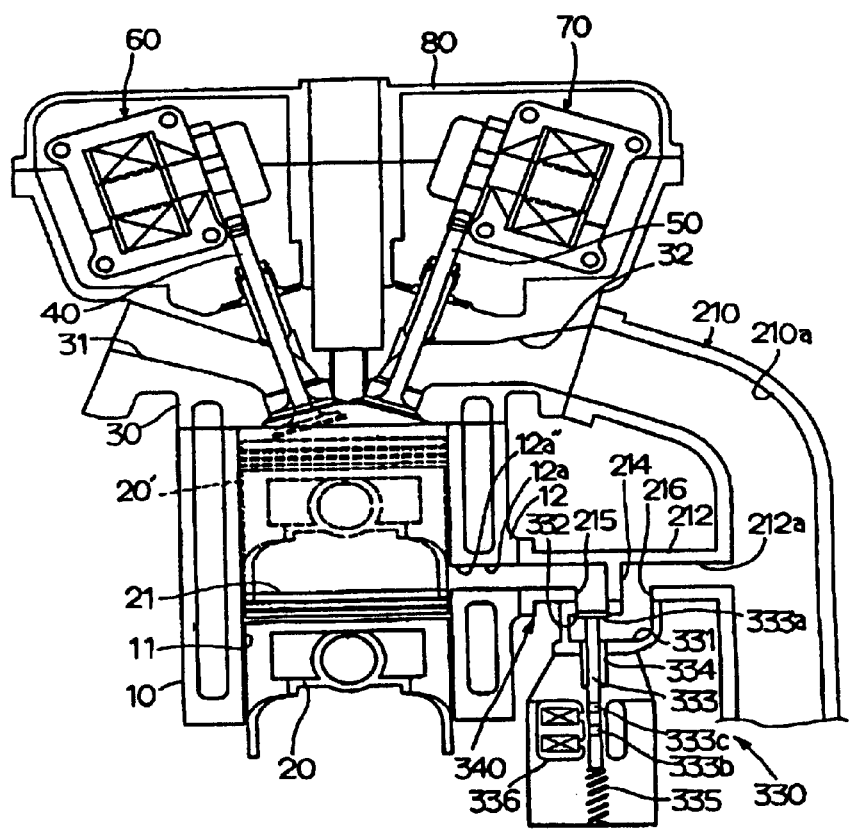
FIG. 5 is a sectional view which shows another embodiment of the exhaust control device of the present invention.

FIG. 5 shows an engine that is equipped with an exhaust control device constituting still another embodiment of the present invention; this embodiment has a construction similar to that of the embodiment shown in FIG. 4, except for the fact that electromagnetic force is used as the driving source of the control valve.

In the engine of this embodiment, as in the embodiment shown in FIG. 4, an exhaust manifold 210 and a bypass exhaust pipe 212 are provided. Furthermore, an electromagnetically driven valve 330 is connected to the bypass exhaust pipe 212 by means of bolts and nuts or the like in the region of the opening parts 215 and 216.

As is shown in FIG. 5, this electromagnetically driven valve 330 is constructed from a U-shaped passage 331 which is formed so that this passage communicates with the opening parts 215 and 216, a valve seat part 332 which is formed on the side that communicates with the opening part 215, a control valve 333 which opens and closes the U-shaped passage 331 by seating on the valve seat part 332 and separating from the valve seat part 332, a valve guide 334 which guides the control valve 333 so that the control valve 333 is free to perform a reciprocating motion, an urging spring 335 which is disposed so that this urging spring 335 engages with one end portion of the control valve 333, and an electromagnetic actuator 336 which is disposed around this end portion of the control valve 333.

The control valve 333 is driven by the urging spring 335, which has a preset urging force, so that the valve part 333a of the control valve 333 is seated on the valve seat part 332, thus closing off the U-shaped passage 331 under ordinary conditions. Specifically, this control valve 333 is formed as a check valve that allows flow only from the cylinder bore 11 toward the exhaust passage 210a via the bypass exhaust port 12a.

Here, for example, the urging force of the urging spring 335 is set at a value which is such that is set at a value which is such that the control valve 333 will not open even when the pressure difference between the pressure on the side of the cylinder bore 11 (upstream side of the control valve 333) and the pressure on the side of the exhaust passage 210a (downstream side of the control valve 333) is at a maximum, and is further set at a value which is such that when the piston 20 is positioned in the vicinity of bottom dead center (BDC), this urging force acts in conjunction with the opening pushing force caused by the residual pressure inside the cylinder bore 11 so that the control valve 333 can be opened merely by causing a relatively small current to flow through the electromagnetic actuator 336. Then, by appropriately driving the electromagnetic actuator 336, it is possible to open the control valve 333 at a desired timing in accordance with the operating conditions of the engine.

Figure 6:
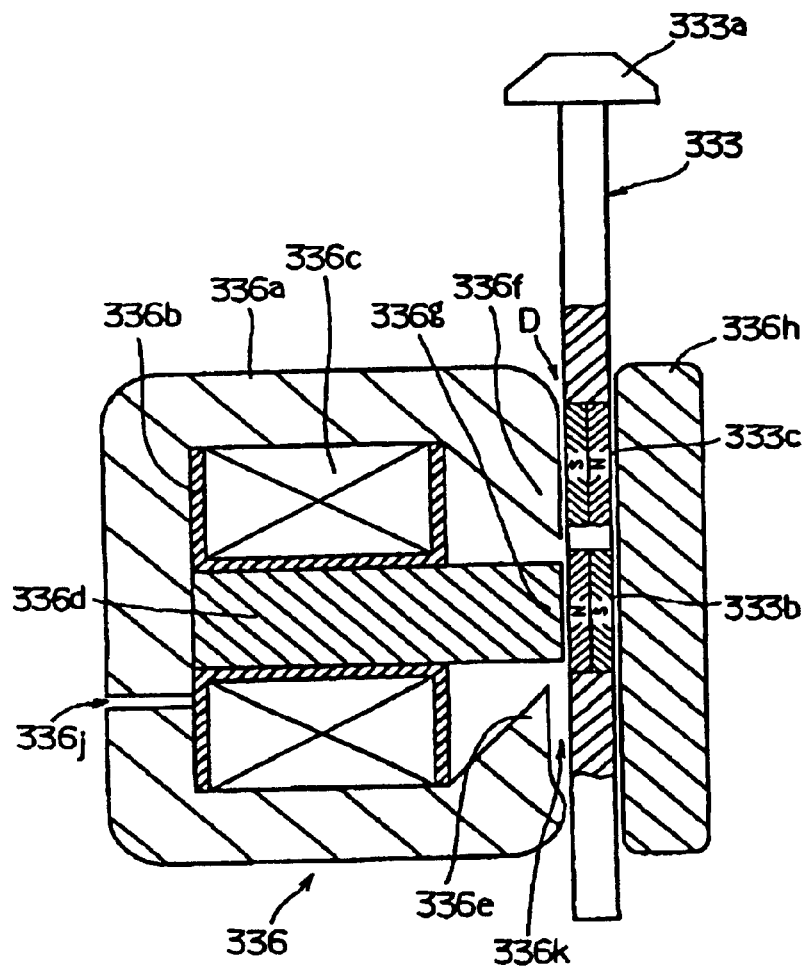
FIG. 6 is a sectional view which shows the schematic construction of the electromagnetic actuator that drives the control valve in the embodiment shown in FIG. 5.

Furthermore, as is shown in FIG. 6, permanent magnet pieces 333*b* and 333*c* are fixed to a region of control valve 333 surrounded by the electromagnetic actuator 336. Furthermore, as is also shown in FIG. 6, these permanent magnet pieces 333*b* and 333*c* are formed so that the polarities of the respective magnetizing surfaces are the opposite of each other, i.e., these permanent magnet pieces are formed so that the magnetizing surface of the permanent magnet piece 333*b* has an N pole→S pole arrangement, while the magnetizing surface of the permanent magnet piece 333*c* has an S pole→N pole arrangement.

The electromagnetic actuator 336 is constructed from a yoke 336*a* which is substantially C-shaped in cross section and which forms a magnetic path, a bobbin 336*b* consisting of a nonmagnetic material such as a synthetic resin or the like which is disposed on the inside of this yoke 336*a*, an excitation coil 336*c* which is wound around this bobbin 336*b* in an annular configuration, a core 336*d* which is disposed in the central portion of the bobbin 336*b*, three magnetic pole parts 336*e*, 336*f* and 336*g* in which magnetic poles are formed by the powering of the coil 336*c*, a yoke 336*h* which acts in conjunction with the abovementioned magnetic pole parts 336*e*, 336*f* and 336*g* to form a magnetic path which is disposed so as to demarcate a specified gap D, and magnetic gaps 336*j* and 336*k*.

In a state in which no current is supplied to the coil 336*c* in the electromagnetic actuator 336 constructed as described above, the magnetic resistance of the magnetic gaps 336*j* and 336*k* is large relative to the magnetic force of the permanent magnet pieces 333*b* and 333*c*; accordingly, a magnetic path which follows the route of permanent magnet piece 333*b* (N pole)→magnetic pole part 336*g*→core 336*d*→yoke 336*a*→magnetic pole part 336→permanent magnet piece 333*c* (S pole)→permanent magnet piece 333*c* (N pole)→yoke 336*h*→permanent magnet piece 333*b* (S pole) is formed. As is shown in FIG. 6, the control valve 333 is positioned so that this valve is offset in an upper resting position. When the control valve 333 is positioned in this resting position, the valve part 333*a* of the control valve 333 is seated on the valve seat part 332, so that the control valve 333 closes off the U-shaped passage 331.

Meanwhile, when an electric current at a specified level is supplied to the coil 336*c* in a specified direction, magnetic flux also passes through the magnetic gaps 336*j* and 336*k*, so that a magnetic path which follows the route of permanent magnet piece 333*b* (N pole)→magnetic gap 336*k*→magnetic pole part 336*e*→yoke 336*a*→magnetic gap 336*j*→yoke 336*a*→core 336*d*→magnetic pole part 336*g*→permanent magnet piece 333*c* (S pole)→permanent magnet piece 333*c* (N pole)→yoke 336*h*→permanent magnet piece 333*b* (S pole), and a magnetic path which follows the route of permanent magnet piece 333*b* (N pole) →magnetic gap 336*k*→magnetic pole part 336*e*→yoke 336*a*→magnetic gap 336*j*→yoke 336*a*→magnetic pole part 336*f*→permanent magnet piece 333*c* (S pole)→permanent magnet piece 333*c* (N pole)→yoke 336*h*→permanent magnet piece 333*b* (S pole), are formed, and the control valve 333 is moved in the valve-opening direction (downward in FIG. 6).

Furthermore, when the current that is supplied to the coil 336*c* is increased, only a magnetic path which follows the route of permanent magnet piece 333*b* (N pole)→magnetic gap 336*k*→magnetic pole part 336*e*→yoke 336*a*→magnetic gap 336*j*→yoke 336*a*→core 336*d*→magnetic pole part 336*g*→permanent magnet piece 333*c* (S pole)→permanent magnet piece 333*c* (N pole)→yoke 336*h*→permanent magnet piece 333*b* (S pole) is formed, and the control valve 333 is moved even further in the valve-opening direction.

In this embodiment, a bypass exhaust path is formed by the abovementioned bypass exhaust port 12*a*, branch passage 212*a* and U-shaped passage 331 to connect cylinder bore 11 and exhaust passage 210*a*, and a bypass exhaust pipe 340 that demarcates a bypass exhaust passage is formed by the branch exhaust pipe 212 and the portion of the cylinder block 10 that demarcates the abovementioned bypass exhaust port 12*a*.

Next, the operation of the engine equipped with the exhaust control device of the present embodiment will be described. First, in the intake stroke, a specified current is supplied to the coil 63 of the electromagnetic actuator 60 so that the movable member 66 moves the intake valve 40 into the open-valve position. As a result, the interior of the cylinder bore 11 is filled with fresh air and mist-form fuel via the intake port 31. Subsequently, when the direction of current flow through the coil 63 is reversed, the movable member 66 moves toward the resting position, and moves the intake valve 40 to the closed-valve position.

In this intake stroke, the electromagnetic actuator 336 is not driven, so that the control valve 333 is maintained in the closed-valve position. Accordingly, the fresh air and mist-form fuel introduced into the cylinder bore 11 are securely accumulated inside the cylinder bore 11 without being blown out toward the exhaust passage 210*a*.

Then, in the compression stroke, the piston 20 moves through the interior of the cylinder bore 11 from bottom dead center (BDC) toward top dead center (TDC), and the mixture is ignited by the spark plug at a specified timing, so that there is a shift to the expansion stroke.

In the expansion stroke, the piston 20 moves through the interior of the cylinder bore 11 from top dead center (TDC) toward bottom dead center (BDC), and this kinetic energy is converted into the rotational force of the crankshaft.

Then, in the exhaust stroke, when the piston 20 is positioned in the vicinity of bottom dead center (BDC), a control signal corresponding to the operating conditions of the engine is output from the control part, and the electromagnetic actuator 336 is driven so that the control valve 333 opens against the urging force of the urging spring 335. As a result, the cylinder bore 11 and the exhaust manifold 210 communicate with each other via the bypass exhaust pipe 340. Then, high-pressure combustion gases (exhaust gases) are first discharged into the exhaust manifold 210 via the abovementioned bypass exhaust pipe 340.

Specifically, combustion gases are discharged directly into the exhaust manifold 210 from the cylinder bore 11 without passing through the exhaust port 32 that is opened and closed by the exhaust valve 50. Then, when the residual pressure inside the cylinder bore 11 drops below a specified level, electromagnetic actuator 336 is deactivated and the control valve 333 is caused to move to the closed-valve position, i.e., the resting position, by the urging force of the urging spring 335, so that the bypass exhaust passage is closed off.

Next, as the piston 20 rises from bottom dead center (BDC) toward top dead center (TDC), a specified current is supplied to the coil 73 of the electromagnetic actuator 70 at a specified timing, so that the movable member 76 moves the exhaust valve 50 into the open-valve position. Then, combustion gases (exhaust gases) are discharged into the exhaust manifold 210 via the opened exhaust port 32. Furthermore, at the point in time at which the upper surface 21 of the piston 20 moves to a point that is higher than the upper inner wall surface 12a" of the bypass exhaust port 12a during the rise of the piston 20, the discharge of combustion gases via the bypass exhaust pipe 340 is blocked; accordingly, the system may be set so that the powering of the electromagnetic actuator 336 is stopped and the control valve 333 is closed after this.

At the point in time at which the exhaust valve 50 is driven in the valve-opening direction by the electromagnetic actuator 70, a portion of the combustion gases has already been discharged via the bypass exhaust pipe 340; accordingly, the residual pressure of the combustion gases that pushes the exhaust valve 50 in the valve-closing direction has dropped. Consequently, as in the abovementioned embodiments, the load that is applied to the electromagnetic actuator 70 is correspondingly lightened, so that the exhaust valve 50 is securely opened at a specified timing by the above-mentioned electromagnetic actuator 70. As a result, the combustion gases are securely discharged into the exhaust manifold 210 ink via the exhaust port 32.

Furthermore, as in the abovementioned embodiments, even in cases where the exhaust valve 50 fails to open as a result of trouble with the electromagnetic actuator 70 or the like, a portion of the combustion gases is securely discharged via the bypass exhaust pipe 340, so that a "limp home" function can be ensured.

Figure 7:
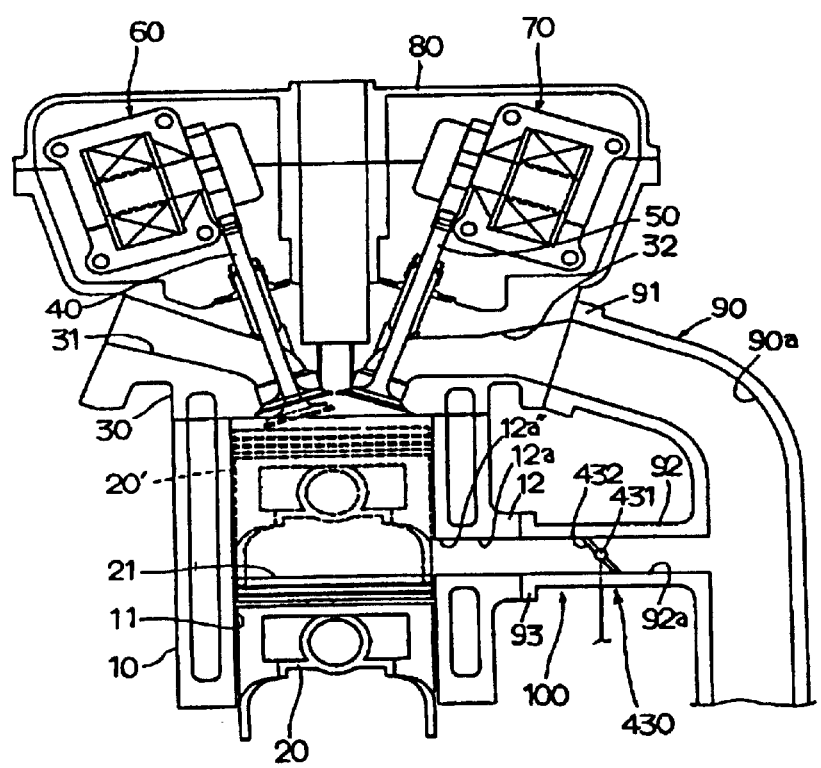
FIG. 7 is a sectional view which shows another embodiment of the exhaust control device of the present invention.

FIG. 7 shows an engine that is equipped with an exhaust control device constituting still another embodiment of the present invention; this embodiment has a construction similar to that of the embodiment shown in FIG. 1, except for the fact a control valve that is opened and closed in accordance with the operating conditions of the engine is provided. As in the embodiment shown in FIG. 1, a branch exhaust pipe 92 is formed at an intermediate point in the exhaust manifold 90 of the engine of this embodiment, and the end portion 93 of this branch exhaust pipe 92 is connected by means of bolts and nuts or the like to a flange part 12 formed on the cylinder block 10. Furthermore, the branch passage 92a and the bypass exhaust port 12a that communicates with the cylinder bore 11 are caused to communicate with each other, so that a bypass exhaust passage is formed.

A butterfly valve 430 used as a control valve that controls the opening and closing of the bypass exhaust passage (bypass exhaust port 12a and branch passage 92a) is disposed at an intermediate point in the branch exhaust pipe 92 so that this butterfly valve 430 is free to open and close. This butterfly valve 430 is constructed from a shaft 431 which is supported on the outer wall of the branch pipe 92 (or on a separately installed spacer wall) so that this shaft 431 is free to pivot, a valve body 432 which is mounted on the shaft 431, and which has a substantially elliptical shape in outline, a return spring (not shown in the figures) which exerts a constant urging force in the direction that causes the valve body 432 to close off the branch passage 92a, and a torque motor (not shown in the figures) which is directly connected to the shaft 431.

Next, the operation of the engine equipped with the exhaust control device of the present embodiment will be described. First, in the intake stroke, a specified current is supplied to the coil 63 of the electromagnetic actuator 60 so that the movable member 66 moves the intake valve 40 into the open-valve position. As a result, the interior of the cylinder bore 11 is filled with fresh air and mist-form fuel via the intake port 31. Subsequently, when the direction of current flow through the coil 63 is reversed, the movable member 66 moves toward the resting position, and moves the intake valve 40 to the closed-valve position.

In this intake stroke, the torque motor is not driven, so that the valve body 432 is maintained in the closed-valve position. Accordingly, the fresh air and mist-form fuel introduced into the cylinder bore 11 are securely accumulated inside the cylinder bore 11 without being blown out toward the exhaust passage 90a.

Then, in the compression stroke, the piston 20 moves through the interior of the cylinder bore 11 from bottom dead center (BDC) toward top dead center (TDC), and the mixture is ignited by the spark plug at a specified timing, so that there is a shift to the expansion stroke.

In the expansion stroke, the piston 20 moves through the interior of the cylinder bore 11 from top dead center (TDC) toward bottom dead center (BDC), and this kinetic energy is converted into the rotational force of the crankshaft.

Then, in the exhaust stroke, when the piston 20 is positioned in the vicinity of bottom dead center (BDC), a control signal corresponding to the operating conditions of the engine is output from the control part, and the torque motor is driven so that the valve body 432 opens against the urging force of the return spring. As a result, the cylinder bore 11 and the exhaust manifold 90 communicate with each other via the bypass exhaust pipe 100. Then, high-pressure combustion gases (exhaust gases) are first discharged into the exhaust manifold 90 via the abovementioned bypass exhaust pipe 100.

Specifically, combustion gases are discharged directly into the exhaust manifold 90 from the cylinder bore 11 without passing through the exhaust port 32 that is opened and closed by the exhaust valve 50. Then, when the residual pressure inside the cylinder bore 11 drops below a specified level, the driving of the torque motor is stopped, and the valve body 432 is caused to move to the closed-valve position, i.e., the resting position, by the urging force of the return spring, so that the bypass exhaust passage is closed off.

Next, as the piston 20 rises from bottom dead center (BDC) toward top dead center (TDC), a specified current is supplied to the coil 73 of the electromagnetic actuator 70 at a specified timing, so that the movable member 76 moves the exhaust valve 50 into the open-valve position. Then, combustion gases (exhaust gases) are discharged into the exhaust manifold 90 via the opened exhaust port 32. Furthermore, at the point in time at which the upper surface 21 of the piston 20 moves to a point that is higher than the upper inner wall surface 12a" of the bypass exhaust port 12a during the rise of the piston 20, the discharge of combustion gases via the bypass exhaust pipe 100 is blocked; accordingly, the system may be set so that the driving of the torque motor is stopped and the valve body 432 is closed after this.

At the point in time at which the exhaust valve 50 is driven in the valve-opening direction by the electromagnetic actuator 70, a portion of the combustion gases has already been discharged via the bypass exhaust pipe 100; accordingly, the residual pressure of the combustion gases that pushes the exhaust valve 50 in the valve-closing direction has dropped. Consequently, as in the abovementioned embodiments, the load that is applied to the electromagnetic actuator 70 is correspondingly lightened, so that the exhaust valve 50 is securely opened at a specified timing by the above-mentioned electromagnetic actuator 70. As a result, the combustion gases are securely discharged into the exhaust manifold 90 ink via the exhaust port 32.

Furthermore, as in the abovementioned embodiments, even in cases where the exhaust valve 50 fails to open as a result of trouble with the electromagnetic actuator 70 or the like, a portion of the combustion gases is securely discharged via the bypass exhaust pipe 100, so that a "limp home" function can be ensured.

In the embodiments described above, a construction was used in which the intake valve 40 was also driven by an electromagnetic actuator 60; however, the present invention can also be used in constructions in which the intake valve 40 is driven by some other driving means.

In the exhaust control device for an internal combustion engine provided by the present invention, as was described above, combustion gases at a relatively high pressure are discharged into the exhaust passage beforehand from a bypass exhaust passage during the exhaust stroke in a internal combustion engine which is devised so that the exhaust valve is opened and closed by an electromagnetic driving mechanism. Accordingly, the residual pressure of the combustion gases that push the exhaust valve in the valve-closing direction is correspondingly lowered. Consequently, the load that is applied to the electromagnetic driving mechanism is correspondingly lightened, so that the size of the electromagnetic driving mechanism can be reduced. Furthermore, in cases where an electromagnetic driving mechanism is also used to drive the intake valve, the parts can be used in common.

Moreover, since the load that is applied to the electromagnetic driving mechanism is lightened, the exhaust valve can be securely opened and closed at a specified timing.

Furthermore, in cases where a control valve that opens and closes the bypass exhaust passage is provided, the blowing out of fresh air and the mixture into the exhaust passage during the intake stroke can be prevented; furthermore, in cases where this control valve is a check valve, back flow from the exhaust passage can be securely prevented.

Furthermore, in cases where the control valve is opened and closed in accordance with the operating conditions of the internal combustion engine, the exhaust can be finely controlled in accordance with the operating conditions of the internal combustion engine.

What is claimed is:

1. An exhaust control device for an internal combustion engine comprising:
   a piston operable to perform reciprocating motion between top dead center and bottom dead center inside a cylinder bore;
   an intake valve and an exhaust valve operable to open and close a combustion chamber positioned at the top of said cylinder bore;
   an electromagnetic driving mechanism operable to drive opening and closing of at least said exhaust valve by electromagnetic force;
   an exhaust passage operable to conduct exhaust gases from said combustion chamber and discharged by opening said exhaust valve;
   a bypass exhaust passage communicating between said cylinder bore and said exhaust passage and disposed in the region of bottom dead center of said piston in said cylinder bore; and
   a control part operable to control said electromagnetic driving mechanism such that when said piston moves to the region of bottom dead center to begin an exhaust stroke, exhaust gases are exhausted through said bypass exhaust passage before said exhaust valve is opened.

2. The exhaust control device of claim 1, wherein said bypass exhaust passage comprises a control valve operable to control opening and closing of said bypass exhaust passage.

3. The exhaust control device of claim 2, wherein said control valve is a check valve that allows only flow from said cylinder bore toward said exhaust passage.

4. The exhaust control device of claim 2, wherein said control valve is biased by a predetermined urging force in a valve closing direction.

5. The exhaust control device of claim 3, wherein said control valve is operable by control signals corresponding to operating conditions of the internal combustion engine.

6. The exhaust control device of claim 3, wherein said control valve is biased by a predetermined urging force in a valve closing direction.

7. The exhaust control device of claim 3, wherein said control valve is operable by control signals corresponding to operating conditions of the internal combustion engine.

8. The exhaust control device of claim 4, wherein said control valve is operable by control signals corresponding to operating conditions of the internal combustion engine.

9. The exhaust control device of claim 1, wherein said control part is operable to control said electromagnetic driving mechanism such that said exhaust valve does not open until after the piston has reached bottom dead center to begin the exhaust stroke.

10. A method of exhaust control in an internal combustion engine comprising:
    reciprocating a piston between top dead center and bottom dead center inside a cylinder bore;
    operating an intake valve and an exhaust valve to open and close a combustion chamber positioned at the top of said cylinder bore;
    operating an electromagnetic driving mechanism to drive opening and closing of at least said exhaust valve by electromagnetic force;
    conducting exhaust gases from said combustion chamber, discharged by opening said exhaust valve, through an exhaust passage;
    communicating said cylinder bore and said exhaust passage with a bypass exhaust passage disposed in the region of bottom dead center of said piston in said cylinder bore; and
    controlling said electromagnetic driving mechanism with a control part such that when said piston moves to the region of bottom dead center to begin an exhaust stroke, exhaust gases are exhausted through said bypass exhaust passage before said exhaust valve is opened.

11. The method of claim 10, wherein said bypass exhaust passage comprises a control valve controlling opening and closing of said bypass exhaust passage.

12. The method of claim 11, wherein said control valve is a check valve that allows only flow from said cylinder bore toward said exhaust passage.

13. The method of claim 11, wherein said control valve is biased by a predetermined urging force in a valve closing direction.

14. The method of claim 11, wherein said control valve is operated by control signals corresponding to operating conditions of the internal combustion engine.

15. The method of claim 12, wherein said control valve is biased by a predetermined urging force in a valve closing direction.

16. The method of claim 12, wherein said control valve is operated by control signals corresponding to operating conditions of the internal combustion engine.

17. The method of claim 13, wherein said control valve is operated by control signals corresponding to operating conditions of the internal combustion engine.

18. The method of claim 10, wherein said controlling comprise opening the exhaust valve only after the piston has reached bottom dead center to begin the exhaust strike.

* * * * *